June 30, 1936.  A. H. NEUREUTHER  2,046,130
SYNCHRONOUS MOTOR
Filed April 16, 1932  2 Sheets-Sheet 1

INVENTOR.
Andrew H Neureuther

June 30, 1936.  A. H. NEUREUTHER  2,046,130
SYNCHRONOUS MOTOR
Filed April 16, 1932  2 Sheets-Sheet 2
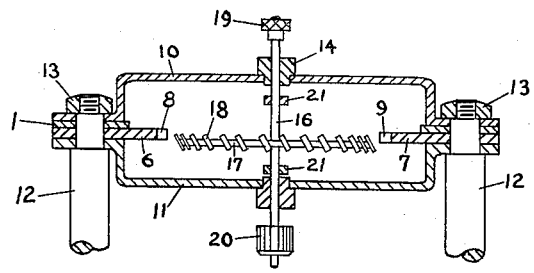
FIG. 3
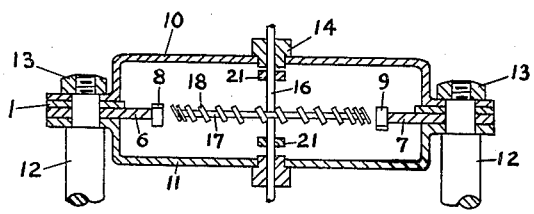
FIG. 4
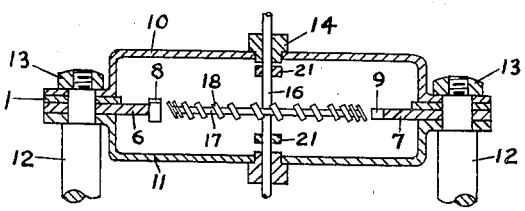
FIG. 5
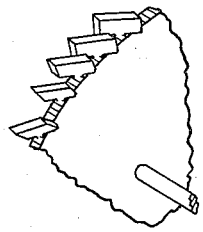
FIG. 6
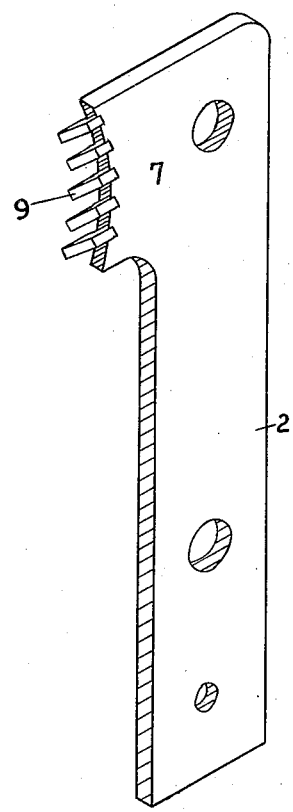
FIG. 7
FIG. 8
INVENTOR.
Andrew H. Neureuther Patented June 30, 1936

2,046,130

UNITED STATES PATENT OFFICE 2,046,130

SYNCHRONOUS MOTOR

Andrew H. Neureuther, Peru, Ill., assignor to Western Clock Company, Peru, Ill., a corporation of Illinois Application April 16, 1932, Serial No. 605,634

7 Claims. (Cl. 172—275)

My invention relates to synchronous motors and has for its object the production of a small synchronous motor driven by the alternating current from commercial lighting and power systems that can be used to drive clock hands or other time indicating means especially when said commercial systems are operated at a regulated frequency of 60 cycles per second or other standard frequency.

A further object of my invention is to produce an extremely simple and inexpensive motor that will immediately come into step with the alternations of the magnetic field when launched at either above or below approximately synchronous speed manually or automatically by any of the usual means and which will remain in step as long as the current flows regardless of the usual electrical load and surge disturbances on such commercial lighting and power lines. And it is readily started and held in synchronism without the usual mechanical movement or inertia means generally employed previous to my invention.

A further object of my invention is to produce a rotor as well as a stator lamination that has the polar projections thereon twisted at an angle to the plane of the lamination of the stator, such twisted polar projections being readily and easily formed up on the rotor and the stator lamination by means of punch press tools and operations and thus are especially suited for inexpensive mass production operations.

I accomplish these objects by the means shown in the accompanying drawings in which:

Fig. 3 is a cross-sectional view similar to Figure 2 showing the rotor held in a different position in relation to the field poles.

Fig. 4 is a cross-sectional view similar to Figure 2 showing the stator laminations with centrally disposed angular polar projections associated with a rotor having the usual polar projections.

Fig. 5 shows a cross-sectional view similar to Figure 2 showing a modification of my motor in which both the rotor and the stator laminations have the twisted polar projections.

Fig. 6 shows a cross-sectional view similar to Figure 2 showing a modification of my motor in which the rotor and only one of the stator laminations have the twisted polar projections.

Fig. 7 shows a perspective view of a stator lamination having the twisted polar projections on same.

Fig. 8 is an enlarged perspective view of the rotor showing the twisted polar projections which polar projections are angularly and substantially centrally disposed to the plane of the disc.

Similar numerals represent the same parts throughout the several views.

Figure 2:
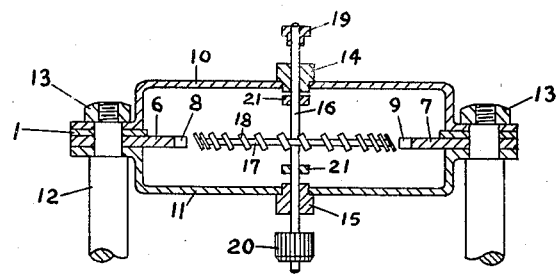
Fig. 2 is a top cross-sectional view along a line 2—2 of Figure 1.

In the drawings 1 represents the frame of the usual clock movement the remainder of which is not shown. Adjacent to this plate 1 and fastened thereto, as shown, are the frames 2 of the motor 3 which have the magnet core 4 fastened across and connecting the lower ends thereof, on which core is mounted the magnet winding 5 as shown, which in operation is connected across the usual commercial alternating current line that has a regulated frequency of 60 cycles per second. The frames 2 and the core 4 are made of magnetic material, the frames 2 having the pole pieces 6 and 7 each of which have a plurality of polar projections or teeth 8 and 9. Bearing frames 10 and 11 are fastened to the frames 2 and plate 1 by means of the pillars 12 and the nuts 13 shown, which also serve to hold the remainder of the usual clock movement in position. In these bearing frames 10 and 11 are mounted the bearings 14 and 15 respectively in which is journaled the shaft 16 on which is mounted a rotor 17. The rotor 17 comprises a disk which has a plurality of polar projections or teeth 18 which are formed out of the periphery of the disk preferably angularly and substantially centrally disposed to the surface of said disk as shown in the rotors in Figures 1 and 2. Mounted on one end of the shaft 16 is the knurled starting member 19 and on the other end of said shaft is mounted the pinion 20.

The rotor 17 is kept positioned well within the influence of the magnetic field of the poles 6 and 7 by means of the collars 21 mounted on the shaft 16 adjacent to the bearings 14 and 15 and the rotor may be positioned in the position shown in Figure 2 when the magnet coil 5 is energized by means of the usual alternating current and in the position shown in Figure 3 when the magnet is not thus energized and resilient means may be employed to retain it in said position during the period when said magnet coil 5 is not energized.

Figure 1:
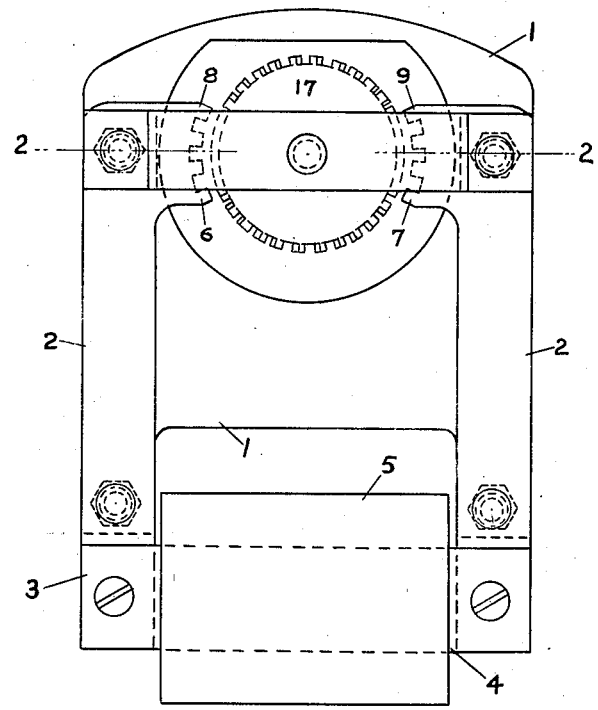
Fig. 1 is a front view showing my motor.

In the modification shown in Figure 4 the polar projections 8 and 9 are formed out of the edge of the pole pieces 6 and 7 respectively and are angularly and substantially centrally disposed to the surfaces thereof similarly as the polar projections are formed on the rotor itself as shown in Figs. 1 and 2.

In the modification shown in Figure 6 the polar projections 8 on one of the pole pieces 6 are formed similarly to those described in Figure 5 while the polar projections 9 remain in the same plane with the pole piece 7, while the rotor has the angularly and substantially centrally disposed polar projections shown in Figure 5.

In operation the usual ends of the coil 5 (which ends are not shown) are connected across the alternating current lighting line. Then the knurled member 19 is taken between the thumb and fingers to spin in the desired direction. Then as above stated the polar projections 18 when the rotor is left spinning as a freely mounted body and approximates synchronous speed will immediately come into step with the alternating magnetic field produced by the alternating current and will remain in synchronism as long as said current flows.

It will be understood, of course, that while I have here shown several forms of my invention, I do not wish to limit myself to the exact constructions shown but desire to have these taken in a sense illustrative of any and all the forms of same as will come fairly within the scope of the appended claims.

I claim:

1. A rotor element for a synchronous motor comprising a shaft, a one-piece disc of magnetic material secured to said shaft, said disc having twisted spaced polar projections forming extensions of the body of the disc and having the peripheral edges thereof arranged in planes displaced from the plane of the body of the disc.

2. A rotor element for a synchronous motor comprising a shaft, a one-piece disc of magnetic material secured to said shaft, said disc having twisted spaced polar projections forming extensions of the body of the disc and having the peripheral edges thereof arranged in planes displaced at an angle of substantially 45 degrees from the plane of the body of the disc.

3. A stator element for a synchronous motor comprising a lamination of magnetic material having a plurality of twisted spaced arcuate polar projections forming extensions of the body of the lamination and having the peripheral edges thereof arranged in planes displaced from the plane of the body of the lamination.

4. A stator element for a synchronous motor comprising a lamination of magnetic material having a plurality of twisted spaced arcuate polar projections forming extensions of the body of the lamination and having the peripheral edges thereof arranged in planes displaced at an angle of substantially 45 degrees from the plane of the body of the lamination.

5. In a synchronous motor, a stator comprising field poles, a plurality of projections on said field poles, means for producing an alternating magnetic field in said projections, in combination with a shaft, a one-piece disc of magnetic material secured to said shaft, said disc having twisted spaced polar projections forming extensions of the body of the disc and having the peripheral edges thereof arranged in planes displaced from the plane of the body of the disc and means for manually starting said rotor.

6. In a synchronous motor, a stator element comprising a lamination of magnetic material having a plurality of twisted arcuate polar projections forming extensions of the body of the lamination and having the peripheral edges thereof arranged in planes displaced from the plane of the body of the lamination, means for producing an alternating magnetic field in said projections, a shaft, a rotor mounted on said shaft comprising a single disc of magnetic material having a plurality of projections cooperating with the polar projections on said stator and means for manually starting said rotor.

7. In a synchronous motor, a stator having elements comprising a lamination of magnetic material having a plurality of twisted arcuate polar projections forming extensions of the body of the lamination and having the peripheral edges thereof arranged in planes displaced from the plane of the body of the lamination, means for producing an alternating magnetic field in said projections, a shaft, a one-piece disc of magnetic material secured to said shaft, said disc having twisted spaced polar projections forming extensions of the body of the disc and having the peripheral edges thereof arranged in planes displaced from the plane of the body of the disc and means for manually starting said rotor.

ANDREW H. NEUREUTHER.